Figure 1:
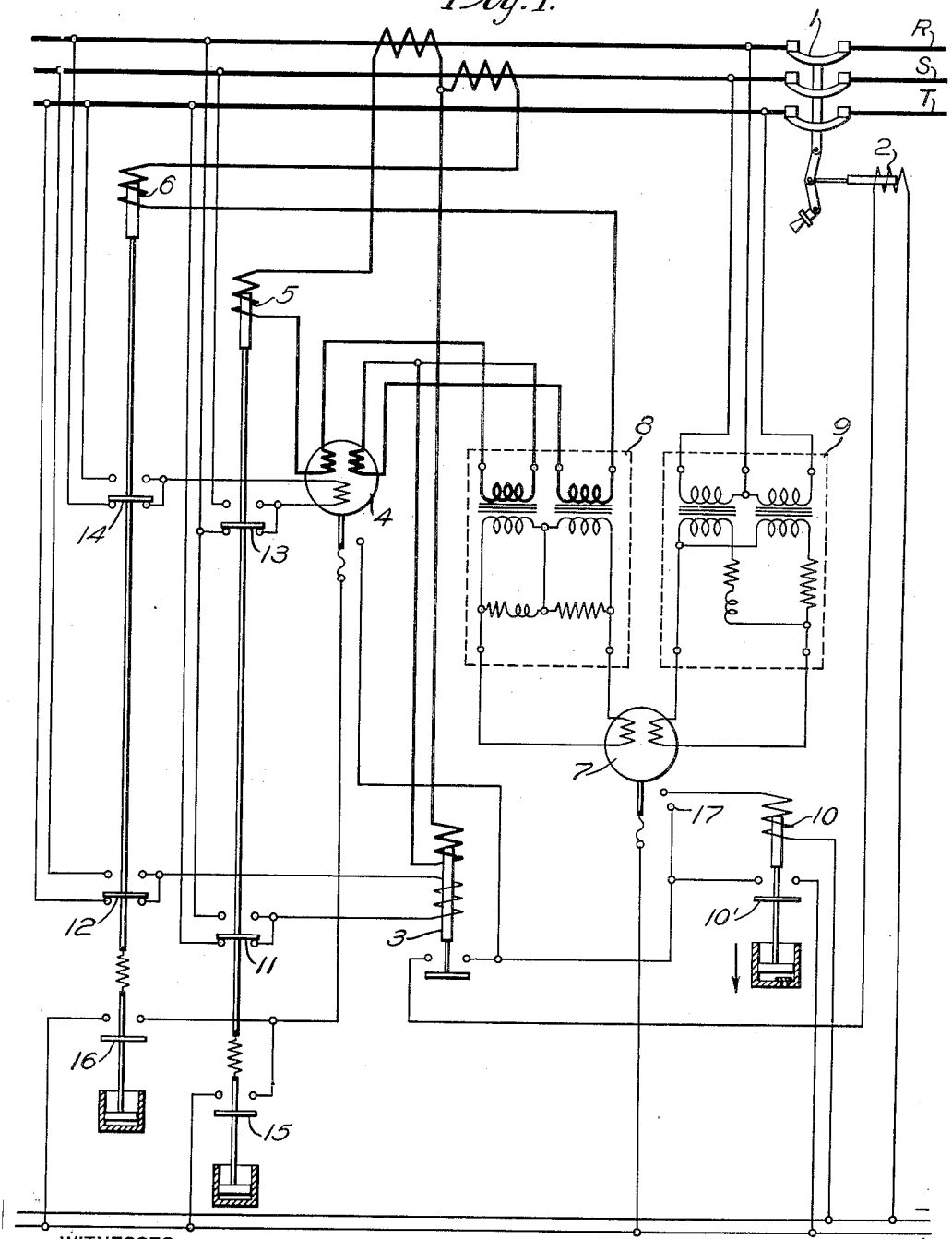

Patented June 25, 1935

2,005,905

UNITED STATES PATENT OFFICE 2,005,905

PROTECTIVE SCHEME FOR TRANSMISSION LINES

Hermann Neugebauer, Berlin-Spandau, Germany, assignor to Westinghouse Electric & Manufacturing Company, East Pittsburgh, Pa., a corporation of Pennsylvania Application October 19, 1932, Serial No. 638,585
In Germany October 20, 1931

8 Claims. (Cl. 175—294)

My invention relates to protective apparatus for transmission lines and particularly to such apparatus of the type in which relays responsive to impedance or reactance characteristics of the protected line are employed.

Many of the known protective arrangements of the type indicated above have the disadvantage that the protective relays may operate improperly as a result of switching operations or of current and voltage oscillations. Although an arrangement has been perfected for shunting the direct-current component of the transmission line starting transient from the impedance relay current coil, by means of an impedance shunt of design determined by the line impedance, it may happen that the relays operate because of oscillations as the latter temporarily decrease the apparent impedance of the line. That is to say, it may occur that at an instant of zero voltage of the disturbance, the current may be of large value. Under these conditions high-speed impedance relays will operate, whereas, in the case of time-element impedance or reactance relays, the relay armature may oscillate back and forth before making contact.

According to my invention, a relay responsive to a negative phase-sequence component of a polyphase line variable is relied upon for clearing the majority of faults. As negative phase-sequence components are present only under unbalanced line conditions, they are present during unsymmetrical faults but are not ordinarily produced by switching operations or oscillations. The negative phase-sequence components are absent during balanced three-phase short circuits. However, as three-phase short-circuits usually develop from line-to-ground or line-to-line faults as a result of unsymmetrical voltage distribution produced by the fault, or because of arcs being blown from the faulted conductors to the unfaulted ones, it is possible in many cases, to prevent the development of three-phase faults by clearing the simpler faults in a very short time-interval.

In order to insure the rapid clearling of three-phase faults, it is advisable to design the protective apparatus so that the shortest possible relay time will elapse in the event of a fault involving the flow of negative phase-sequence fault current. A somewhat longer time interval may then be permitted to elapse in the clearing of symmetrical faults. In sectionalized systems in which a very short definite time delay is permitted to elapse in the clearing of all faults, it is possible to further reduce the clearing time for unsymmetrical faults, as a relay responsive to negative phase-sequence current is not substantially affected by switching operations or oscillations.

It is accordingly an object of my invention to provide a novel protective system for polyphase transmission circuits, in which unsymmetrical faults are cleared in the shortest possible time interval, and symmetrical faults are cleared after a time delay.

Other objects of my invention will become evident from the following detailed description taken in conjunction with the accompanying drawings, in which Figure 1 is a diagrammatic view of a protective system embodying my invention.

Figure 2:
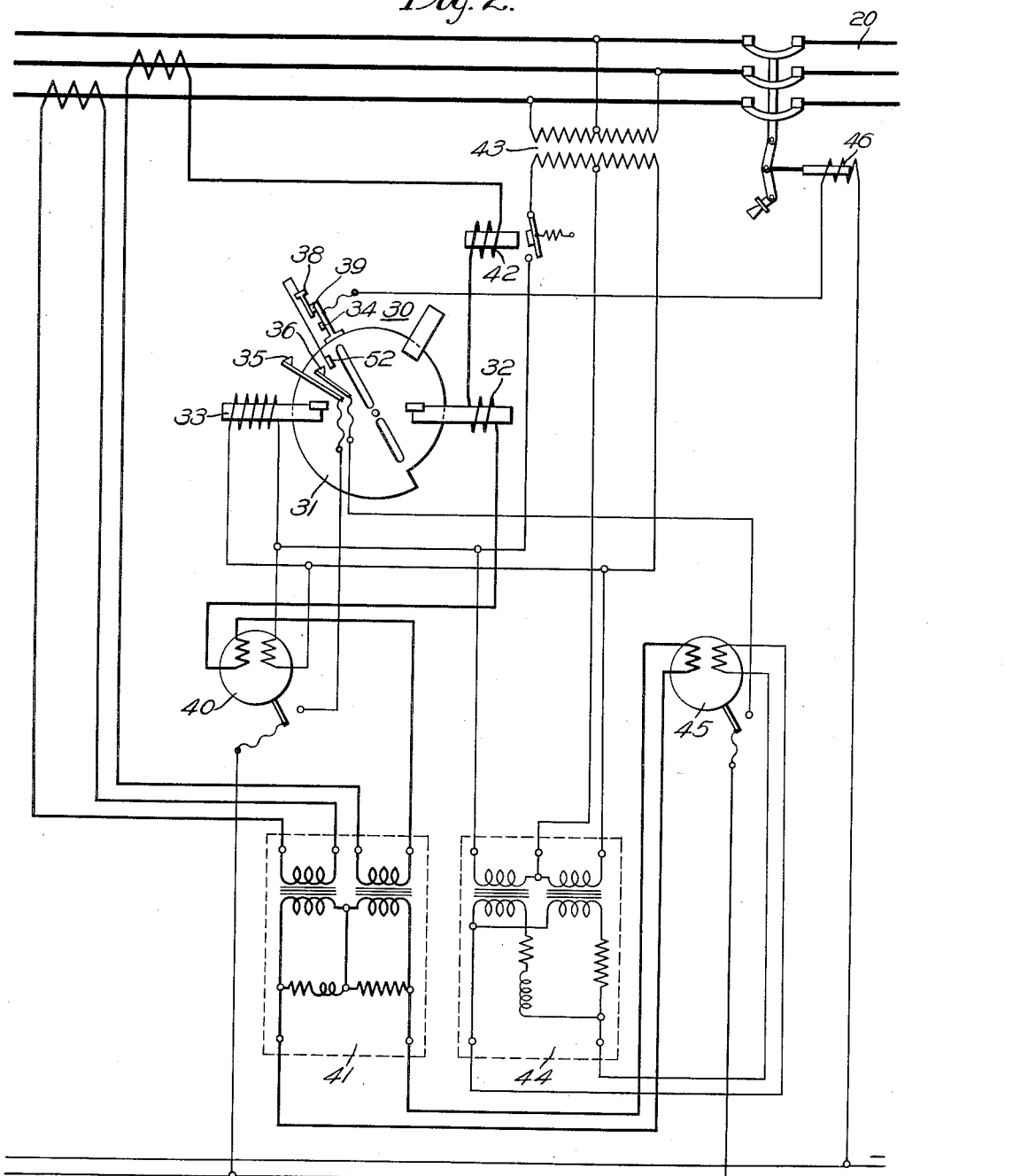

Fig. 2 is a diagrammatic view of a modification of the system shown in Fig. 1.

Referring to Fig. 1 in detail, a circuit breaker 1 having a trip coil 2 is provided for controlling the flow of power in an ungrounded transmission line RST, in the usual manner. The circuit breaker 1 is controlled by a directional relaying arrangement comprising an instantaneous impedance relay 3, a power directional relay 4 and a pair of overcurrent relays 5 and 6. The overcurrent relays 5 and 6 are each provided with two sets of instantaneous contact members 11, 13 and 12, 14 respectively, for controlling the potential coils of the impedance relay 3 and power directional relay 4, and with a set of time element contact members 15 and 16 respectively, operable to closed position with a time delay of the order of 0.5 second. The trip coil 2 is arranged to be energized in response to closure of either set of time element contact members 15 or 16 when the impedance relay 3 and power directional relay 4 are both closed.

In addition to the power directional relay 4, another power directional relay 7, energized in accordance with the negative phase-sequence power flow in the transmission line RST, is provided. A negative phase-sequence current filter 8 and a negative phase-sequence voltage filter 9, which may be of suitable types known in the art, are provided for energizing the current and voltage windings of the power directional relay 7.

An auxiliary relay 10 is provided for shunting the contact members 17 of the power directional relay 7 after a momentary closure of the latter, to prevent interruption of the trip circuit if the contact members 17 should bounce or chatter. The auxiliary relay 10 is provided with contact members 18' which close instantaneously but which are delayed for a short time-interval on opening.

The instantaneous contact members 11 and 12 are arranged in such manner that upon the occurrence of a fault, the potential coil of the impedance relay 3 is energized in accordance with the voltage most affected by the fault. The instantaneous contacts 13 and 14, on the other hand, are arranged to connect the potential coil of the directional relay 4 for energization in accordance with the voltage least affected by the fault. It will be seen that this arrangement permits the use of two relays 3 and 4 to perform protective functions which would otherwise require a larger number of relays.

The operation of the above-described apparatus may be set forth as follows: Assuming the circuit breaker 1 to be closed as shown and that a fault occurs on the transmission line RST in the direction to cause operation of the directional apparatus, one or both of the overcurrent relays 5 and 6 operate depending upon the phases of the line RST affected by the fault. At the same time, if the fault is unsymmetrical, the power directional relay 7 closes substantially instantaneously. It will be assumed for purposes of illustration that the overcurrent relay 5 and the directional relay 7 operate. The instantaneous contact members 11 and 13 of the overcurrent relay close to complete circuits for the potential coils of the impedance relay 3 and power-directional relay 4. If the fault lies within the section of the line RST corresponding to the adjustment of the impedance relay 3, the latter closes substantially instantaneously to complete a trip circuit through the trip coil 2. The circuit breaker then opens in the shortest possible time after the occurrence of the fault.

If the fault on the line RST is symmetrical, the directional relay 7 remains open. However, the directional relay 4 closes, and after the lapse of 0.5 second, the time-element contact members 15 and 16 of the overcurrent relays close. Upon closure of either set of contact members 15 or 16, the trip coil 2 is energized, and the circuit breaker 1 trips open after a total time lapse of slightly more than 0.5 second.

Fig. 2 shows another embodiment of the present invention in which a time-element impedance relay 30 is employed for the protection of a line section 20. The relay 30 consists of an induction disc 31 mechanically connected in any suitable manner to an adjusting contact member 34. Suitable driving magnets having a current coil 32 and a voltage coil 33 are provided for producing opposing torques acting upon the disc 31 in a well-known manner. The current coil 32 is connected in series with the current coil of a directional relay 40 and with a phase connection of a negative phase-sequence current filter 41 energized from the line section 20. The voltage coil 33 of the time-element impedance relay 30 is arranged to be energized in response to operation of an over-current relay 42.

A negative phase-sequence voltage filter 44, energized by means of a pair of potential transformers 43, is provided for energizing the potential coil of a directional phase-sequence relay 45. The current coils of the relay 45 are energized by means of the current filter 41, in such manner that the relay 45 responds to directional negative phase-sequence power.

The time element relay 30 is provided with a pair of timing contact members 35 and 36 which are driven by suitable timing means such as clockwork mechanism (not shown). The contact members 35 and 36 are provided with release mechanism of any suitable type (not shown) so arranged that their timing movements are simultaneously initiated in response to operation of the relay 42.

The induction disc 31 of the time-element impedance relay 30 is held by a stop member 38 in a normal position which corresponds to the line impedance for a short-circuit at a predetermined distance from the relay. This distance may be, for example, two thirds of the length of the section 20 controlled by the relay 30. The stop member 38 may be adjustable so that the induction disc 31 may be normally held in any of a number of positions corresponding to different line impedances or fault distances.

In addition to the contact member 34, the induction disc 31 also drives a movable contact member 39 which normally engages the stop member 38 and makes electrical contact therewith, and another contact member 52 in cooperative relationship with the timing contact member 36.

A circuit breaker having a trip coil 46 is provided for controlling the flow of power in the transmission line. The trip coil 46 is arranged to be energized when the contact members 36 and 52 are engaged, the contact members 38 and 39 are engaged, and the directional phase-sequence relay 45 is closed; and also when the contact members 34 and 35 are engaged, and the directional relay 40 is closed.

The operation of the apparatus shown in Fig. 2 may be set forth as follows: In response to a fault in the protected section 20, the overcurrent relay 42 closes to energize the potential coil 33 of the relay 30 and the potential coil of the phase-sequence directional relay 45, and to initiate operation of the timing contact members 35 and 36. If the fault is within the distance corresponding to the adjustment of stop member 38, the torque on the disc 31 acts counter-clockwise in the figure, to maintain engagement of the contact member 39 with the stop member 38. The directional relay 40 closes as the fault is assumed to be within the protected section 20 and to the right in the figure.

If the fault is unsymmetrical, the directional phase-sequence relay 45 closes, and at the expiration of a very short definite time interval, the timing contact member 36 engages the contact member 52 to complete a circuit for the trip coil 46.

If the fault is symmetrical, the directonal relay 45 remains open, and at the expiration of a somewhat longer definite time interval, the contact member 35 engages the contact member 34 to complete a circuit for the trip coil 46.

If the fault lies beyond the distance corresponding to the adjustment of the stop member 38, the induction disc 31 is rotated clockwise in Fig. 2 to a position determined by the apparent impedance of the faulted line. As the movable contact members 39, under these conditions, is separated fom the stop 38, engagement of the contact members 35 and 52 cannot complete a circuit for the trip coil 46. The trip coil 46 accordingly remains deenergized until the timing contact member 35 engages the contact member 34, at the expiration of a variable time interval determined by the apparent impedance of the faulted line.

It will be seen that in the protective system shown in Fig. 2, faults within a predetermined distance of the relaying station and in the proper direction, are cleared in a minimum definite time interval, if unsymmetrical. If the fault is within the predetermined distance and in the proper direction but is symmetrical, it is cleared in a somewhat longer definite time interval. Faults in the proper direction but beyond the predetermined distance from the relaying station are cleared in a variable time-interval, which is longer than either of the definite time-intervals mentioned above and which increases with increasing distance to the fault.

I do not intend that the present invention shall be restricted to the specific structural details, arrangement of parts or circuit connections herein set forth as various modifications thereof may be effected without departing from the spirit and scope of my invention. I desire, therefore, that only such limitations shall be imposed as are indicated in the appended claims.

I claim as my invention:

1. In protective apparatus for a polyphase sectionalized transmission circuit, a circuit breaker in said circuit, relay means operable in response to unsymmetrical faults in a predetermined section of said circuit, relay means operable only with time element greater than that of said first-mentioned relay means in response to symmetrical faults in said predetermined section, and means for causing said circuit breaker to open in response to operation of either of said relay means upon the occurrence of a fault in said predetermined section.

2. In protective apparatus for a polyphase transmission circuit, a circuit breaker in said circuit, relay means operable in response to unsymmetrical faults in said circuit within a predetermined distance of said circuit breaker, relay means operable only with a time element greater than that of said first-mentioned relay means in response to symmetrical faults within said predetermined distance, and means for causing said circuit breaker to open in response to operation of either of said relay means upon the occurrence of a fault within said predetermined distance.

3. In protective apparatus for a polyphase alternating-current circuit, a circuit breaker in said circuit, relay means responsive to a negative symmetrical component of a polyphase electrical condition of said circuit and operable under predetermined unsymmetrical fault conditions of said circuit within a predetermined distance of said circuit breaker, relay means operable only with a time-element greater than that of said first-mentioned relay means in response to predetermined abnormal conditions, within said distance, to which said first-mentioned relay means does not respond, and means for causing said circuit breaker to open in response to operation of either of said relay means upon the occurrence of a fault within said predetermined distance.

4. In directional protective apparatus for a polyphase alternating-current circuit, a circuit breaker in said circuit, high-speed directional relay means responsive to negative phase-sequence power flow in said circuit under predetermined unsymmetrical fault conditions of said circuit, directional overcurrent means operable with time delay in response to predetermined overcurrent conditions of said circuit to which said high-speed relay means does not respond, and means for causing said circuit breaker to open in response to operation of either said high-speed relay means under said predetermined unsymmetrical fault conditions or said overcurrent means under said predetermined overcurrent conditions.

5. In protective apparatus for a polyphase alternating-current circuit, a circuit breaker in said circuit, high-speed relay means responsive to negative phase-sequence power flow in said circuit under predetermined unsymmetrical fault conditions of said circuit, a plurality of phase relays energized from different phases of said circuit, said phase relays being operable with time delay under sustained abnormal conditions to which said first mentioned relay means does not respond, and means for causing said circuit breaker to open in response to operation of said high-speed relay means under said predetermined unsymmetrical fault conditions or in response to operation of one or more of said phase relays under said sustained abnormal conditions.

6. In protective apparatus for a polyphase alternating-current circuit, a circuit breaker in said circuit, high-speed relay means responsive to a negative symmetrical component of a polyphase electrical condition of said circuit under predetermined unsymmetrical fault conditions of said circuit, a plurality of overcurrent phase relays energized in accordance with the currents in different phases of said circuit, said phase relays being operable with definite time delay under predetermined overcurrent conditions to which said high-speed relay means does not respond, and means for causing said circuit breaker to open in response to operation of said high-speed relay means under said predetermined unsymmetrical fault conditions or said phase relays under said predetermined overcurrent conditions.

7. In protective apparatus for a polyphase transmission circuit, a circuit breaker in said circuit, distance relay means operable in a short time interval in response to unsymmetrical faults within a predetermined distance of said circuit breaker and operable after a longer time interval in response to symmetrical faults within said predetermined distance, and control means effective to cause said circuit breaker to open in response to operation of said distance relay means, said control means including directional relay means for preventing the opening of said circuit breaker in response to faults in a predetermined direction therefrom.

8. In protective apparatus for a polyphase transmission circuit, a circuit breaker in said circuit, distance relay means operable with a short definite time delay in response to unsymmetrical faults within a predetermined distance of said circuit breaker and with a longer definite time delay in response to symmetrical faults within said predetermined distance, said distance relay means being operable with variable comparatively long time delay in response to faults beyond said distance, and control means effective to cause said circuit breaker to open in response to operation of said distance relay means, said control means including directional relay means for preventing the opening of said circuit breaker in response to faults in a predetermined direction therefrom.

HERMANN NEUGEBAUER.